United States Patent [19]

Geisenheimer

[11] Patent Number: 4,957,311

[45] Date of Patent: Sep. 18, 1990

[54] DIRECT MAIL ADVERTISING SYSTEM

[76] Inventor: Herman S. Geisenheimer, c/o Our Way Studio, 195 Main St., Hackensack, N.J. 07601

[21] Appl. No.: 385,930

[22] Filed: Jul. 26, 1989

Related U.S. Application Data

[63] Continuation of Ser. No. 93,245, Sep. 4, 1987, abandoned.

[51] Int. Cl.$^5$ ....................... G09F 11/00; G09F 11/30; G09B 12/22; B42D 15/00

[52] U.S. Cl. ........................................ 283/56; 283/79; 283/48.1; 229/92.8

[58] Field of Search ................... 283/51, 52, 56, 48 R, 283/79, 81, 82; 229/92.8; 40/404

[56] References Cited

U.S. PATENT DOCUMENTS

| | | | |
|---|---|---|---|
| 449,973 | 4/1891 | Smith | 283/48 R |
| 1,381,609 | 6/1921 | Woronzoff | 283/48 R |
| 1,729,916 | 10/1929 | Vernon | 283/48 R |
| 2,279,164 | 4/1942 | Gettleman | 283/56 |
| 2,284,586 | 5/1942 | McDermott . | |
| 3,159,329 | 12/1964 | Hiersteiner . | |
| 3,164,317 | 1/1965 | Bogen | 283/79 |
| 3,718,277 | 2/1973 | Volkert . | |
| 4,204,639 | 5/1980 | Barber | 283/81 |
| 4,520,958 | 6/1985 | Jones et al. | 283/51 |
| 4,602,447 | 7/1986 | Feingold | 40/404 |
| 4,602,737 | 7/1986 | Lorenz | 229/92.8 |
| 4,606,555 | 8/1986 | Adams | 283/52 |
| 4,617,215 | 10/1986 | Telesco | 283/51 |
| 4,636,179 | 1/1987 | Gentile et al. | 283/56 |
| 4,687,231 | 8/1987 | Hartman | 283/82 |
| 4,791,281 | 12/1988 | Johnsen et al. | 283/56 |
| 4,795,196 | 1/1989 | Hyun | 283/56 |

FOREIGN PATENT DOCUMENTS

| | | | |
|---|---|---|---|
| 672555 | 12/1929 | France | 283/56 |

OTHER PUBLICATIONS

Volkert and Hiersteiner discussed in "Background of Invention", pp. 1-2 of application.

McDermott discussed in amendment filed simultaneously herewith.

*Primary Examiner*—Douglas D. Watts
*Assistant Examiner*—Paul M. Heyrana, Sr.
*Attorney, Agent, or Firm*—Natter & Natter

[57] ABSTRACT

A bulk mail card is separable into two portions along a perforation line. One of the portions is configured as an index card having necked apertures for storage in a rail type card file. The index card carries stored reference information relating to an advertiser. The remaining portion serves as a direct response medium such as a return mail card, discount coupon or redemption coupon.

10 Claims, 3 Drawing Sheets

DIRECT MAIL ADVERTISING SYSTEM

This application is a continuation of application Ser. No. 93,245, filed Sep. 4, 1987, now abandoned.

FIELD OF THE INVENTION

The invention relates generally to advertising by mail and more particularly to bulk mail cards distributed in packets.

BACKGROUND OF THE INVENTION

Prior magazine advertisements have featured pages with tear-out portions containing order forms or return mail cards with a business reply address pre-printed thereon. Magazine and newspaper print advertisements have also contained tear away coupons relating to an advertised product.

Print media advertisements with responsive tear-outs served a useful purpose in that they elicited from a potential customer either actual sales or a response which indicated a measure of the effectiveness of the advertising and marketing promotion of the product.

A typical magazine response advertisement of this format was illustrated in U.S. Pat. No. 3,159,329 issued Dec. 1, 1964. While useful as a marketing tool, the response advertisement had some drawbacks, one of which involved its relatively complicated and costly structure which included the application of marginal adhesive layers. A further drawback related to its recipient base, that is, only readers of the publication would possibly see the advertisement.

In a similar vein, the printed folder disclosed in U.S. Pat. No. 3,718,277, issued Feb. 27, 1973 featured printed material and a return mailer. The potential customer base of such advertisement was enhanced by the selectiveness of the appropriate mailing list employed. While the folder presented an improvement over the magazine tear-out response mailer of U.S. Pat. No. 3,159,329, it too had disadvantages. One of such disadvantages was the printing costs and related expense of the large folder itself. In addition, the folder portion remaining after the tear-out response was removed was usually discarded. Thus, the folders of U.S. Pat. No. 3,718,277 may not have been worth the expense of printing, construction and mailing in terms of response rate.

BRIEF SUMMARY OF THE INVENTION

The invention relates to a bulk mail card for mailing distribution in a packet or deck of cards of various advertisers. The bulk mail cards have a convenient information storage portion designed to be retained by the recipient for later recall. In the field of marketing, retention of later retrieval provides an invaluable tool for promoting or selling a product or service.

The bulk mail card generally comprises a stiff paper sheet which is separable into two distinct portions. One portion is a permanent storage index card bearing information for later retrieval such as information normally carried on a business card, e.g. type of product or service, company name, address and telephone number. The index card can comprise a card having necked apertures for attachment and storage on a rail type index file. The index card may also carry information stored in machine readable format such as, an optical code, magnetic stripe or punched apertures.

The remaining portion of the bulk mail card serves as a disposable direct response medium such as a return mail card or store redemption coupon. The index and response portions are separable from one another along a tear-away perforation line.

When a packet containing a deck of cards of different advertisers is received, the recipient selects from the cards, the products or services of interest. From the selected cards, the recipient separates the card portions. The disposable response medium portion, comprising the return mail card, discount coupon, redemption coupon or the like is used and the permanently stored information on the index card portion is filed for subsequent retrieval.

From the foregoing compendium, it will be appreciated that it is a consideration of the present invention to provide a direct mail advertising system of the general character described which is not subject to the disadvantages of the background art aforementioned.

A further consideration of the present invention is to provide a direct mail advertising system of the general character described which provides an enhanced rate of response.

An aspect of the present invention is to provide a direct mail advertising system of the general character described which is simple in construction, relatively low in cost, yet high in efficiency.

A feature of the present invention is to provide a direct mail advertising system of the general character described which is capable of being mass produced and transmitted to selected recipients through a cooperative, bulk mail distribution.

A further aspect of the present invention is to provide a direct mail advertising system of the general character described which facilitates permanent information storage by a recipient for later retrieval while at the same time also providing separable information capable of immediate usage in disposable format.

Further considerations, features and aspects of the present invention in part will be obvious and in part will be pointed out hereinafter.

With these ends in view, the invention finds embodiment in certain combinations of elements, arrangements of parts and series of steps by which the aspects, features and considerations aforementioned and certain other aspects, features and considerations are hereinafter attained, all as fully described with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention.

DESCRIPTION OF THE PREFERRED EMBODIMENTS

Figure 1:
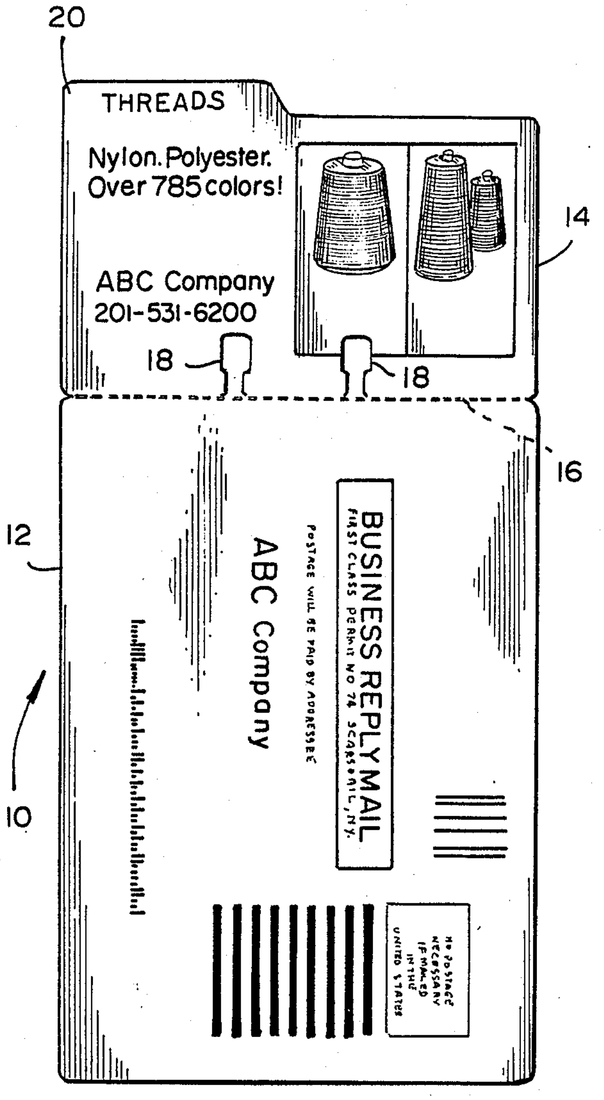
FIG. 1 is a plan view of a typical bulk mail card constructed in accordance with and embodying the direct mail advertising system of the present invention and showing printed information carried on two portions of the card which are separable from one another along a perforation line.

In accordance with the present invention, a direct mail advertising system comprises a deck of pre-printed mail cards of various advertisers commonly mailed on a cooperative basis within a single packet or envelope to prospective purchasers or users on a mailing list. Appropriate mailing lists have been classified with respect to the particular criteria for potential customers or users of the advertisers' products and services.

The bulk mail cards carry information arranged in different arrays for different purposes. On one portion of the card, the indicia array comprises advertising copy or information relating to the advertiser's product or services in a disposable reply card format suitable for direct response or immediate usage. In a different portion of the card, the indicia array comprises information suitable for permanent storage and retrieval. The different portions are physically separable along a perforation line and the portion carrying the permanent storage information includes necked cutouts suitable for use in mounting the portion in a rail card file.

Referring now in detail to the drawings, the reference numeral 10 denotes generally a bulk mail card constructed in accordance with and embodying the invention. The card is formed of suitable stiff paper or cardboard and includes various arrays of indicia printed thereon. In a preferred format, the card 10 is of generally elongated rectangular shape and includes two distinct portions, 12, 14. The portions 12, 14 are separable along a perforation line 16. In order to facilitate such separation, the corners of the two portions at the perforation line 16 are notched as illustrated in FIG. 1.

It should be noted that indicia which includes information concerning the products or services of an advertiser, the advertisers name and telephone number is carried on the portion 14. Such information can be printed on either or both sides of the portion 14.

Figure 2:
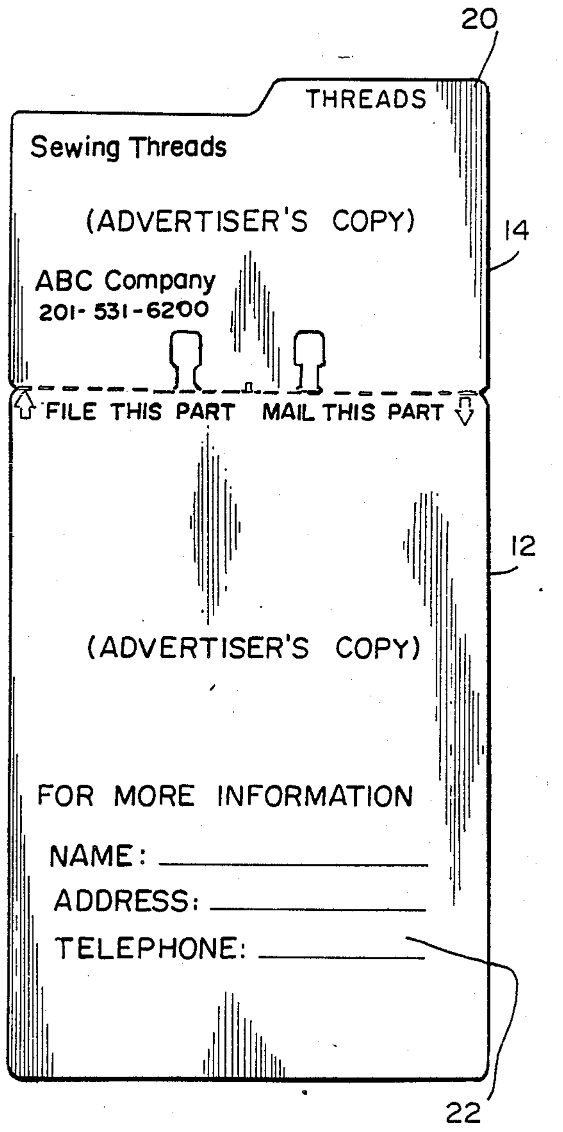
FIG. 2 is a rear plan view of the bulk mail card illustrated in FIG. 1.

It will be appreciated that the portion 14 is configured in the shape of a telephone index card and includes a pair of necked apertures 18 die cut into the body of the portion 14 from the perforation line 16. Such apertures are dimensioned and spaced apart from one another so as to accommodate the portion 14, on a standard rail type card file such as those commonly available under the trademark Rollodex. Additionally, it should be noted that a segment 20 of the portion 14 extends above the upper edge of the portion 14 to provide a tab for carrying pre-printed reference information for use in properly filing and accessing the portion 14. As will be observed from FIG. 2, the reverse side of the card portion 14 may contain additional, similar or identical information pre-printed thereon.

The remaining portion 12 carries on one face, a pre-printed business reply mail response card address as illustrated in FIG. 1. On the reverse face of the portion 12, the potential customer will insert, in appropriately provided blank spaces 22, name and address identification information so that the advertiser can contact or forward additional information to the prospective user/purchaser. The blank spaces 22 and accompanying indicia may also or alternately comprise an order form for an actual purchase.

Figure 3:
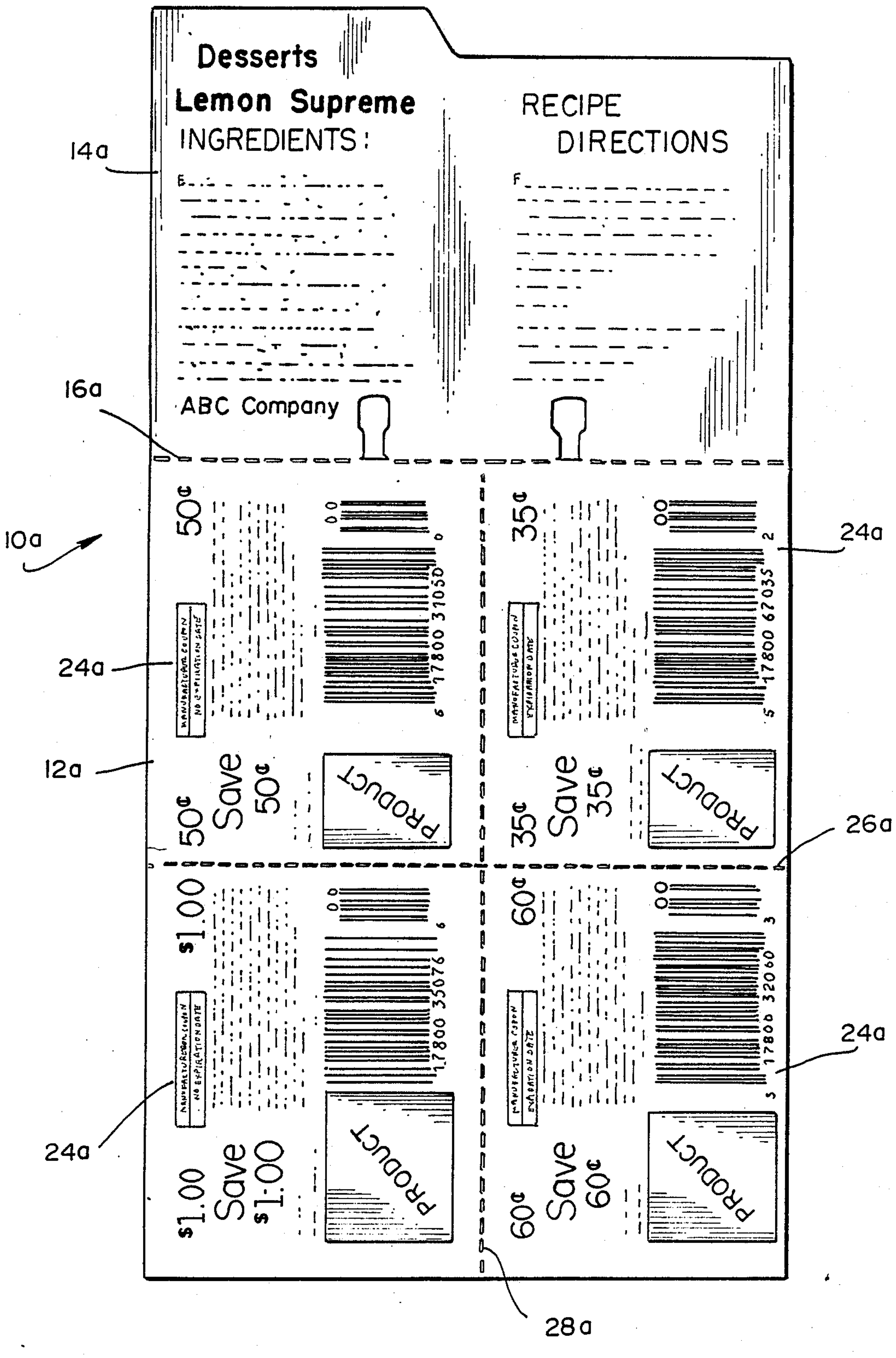
FIG. 3 is a top plan view of an alternate embodiment of the bulk mail card wherein information comprising store redemption coupons is provided on a disposable reply portion of the card.

In the alternate embodiment of the invention illustrated in FIG. 3, like numerals are employed to designate like components bearing, however, the suffix "a". In this embodiment, a bulk mail card **10*a* includes an index card portion 14*a* and a response portion 12*a*. Where, for example, the advertiser is a merchandiser of food products, imprinted upon the index card portion 14*a* is a cooking recipe illustrating the employment of one of its products. The index card portion 14*a* is identical in physical construction, however, to the index card portion 14 of the prior embodiment with the sole distinction relating to the nature of the information imprinted on the card. Alternately, however, the index card portion 14*a* may be of different size than that of the portion 14** for accommodation in a larger or smaller size rail type file system.

As with the prior embodiment, the portions **12*a*, 14*a*, are separable along a perforation line 16*a*. The portion 12*a* carries, in lieu of a response mail card, a plurality of printed store redemption coupons 24*a*. Each of the coupons 24*a* may be separated from the remaining coupons along suitable perforation lines such as a pair of intersecting perforation lines 26*a*, 28*a***.

It should also be appreciated that the stored information on the index card portions need not comprise printed indicia and may comprise in lieu of or in addition to printed indicia, machine readable information. In this regard, attention is directed to the alternate embodiment illustrated FIG. 4.

Figure 4:
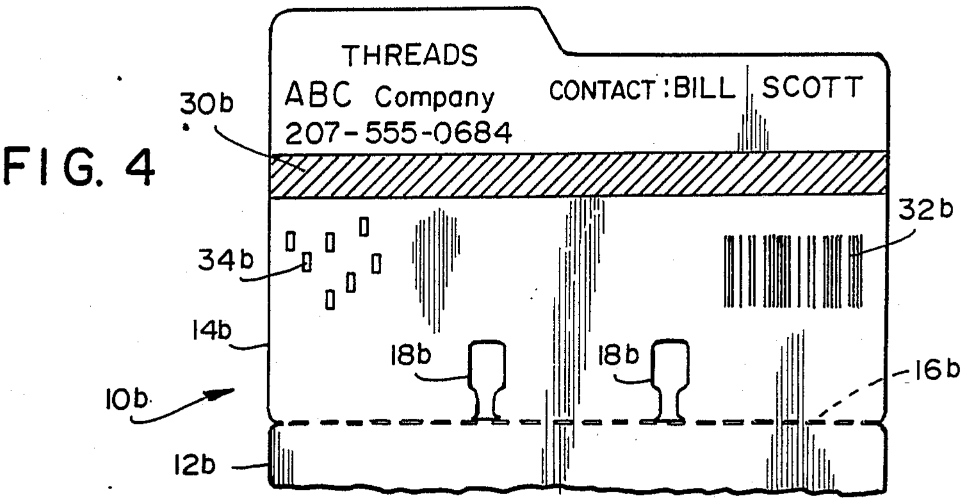
FIG. 4 is a fragmentary plan view of an alternate embodiment of the invention and illustrating an index card portion carrying information stored in machine readable format.

In the embodiment of FIG. 4 an index card portion **14*b* of a bulk mail card 10*b* is shown. In addition to printed indicia relating to a manufacturer or product, the portion 14*b* includes a magnetic information containing stripe 30*b*. In accordance with the invention, when utilizing the card portion 14*b*** for information retrieval the user inserts the card through an appropriate reading device such as that presently employed to read magnetic stripes on credit cards and may obtain access or entry to a computer system for further information or a suitable visual representation of the encoded information on an optical display.

Visual displays of recorded information are particularly well suited in instances wherein the encoded data might comprise a cooking recipe as previously illustrated with reference to the embodiment of **14*a*. In addition to a magnetic stripe, alternate machine readable data recording formats may be employed on the card portion 14*b* such as an optical code 32*b* and/or punched apertures 34*b***.

Figure 5:
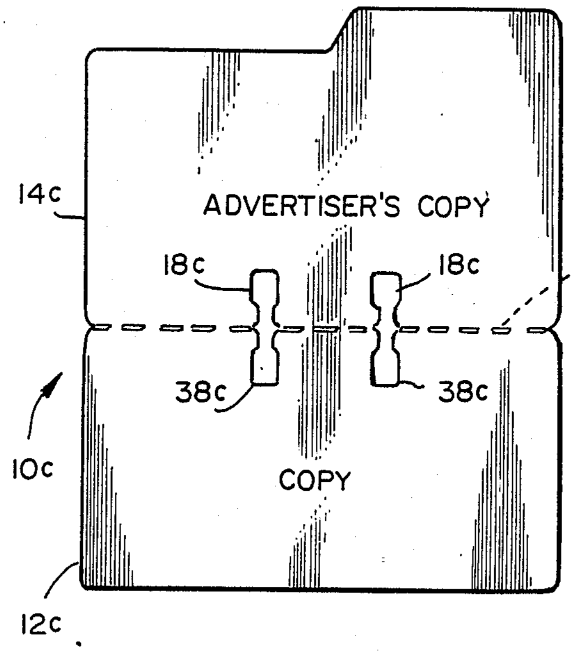
FIG. 5 is a plan view of a further embodiment of the invention wherein both portions of the card are configured for storage on a rail type card file.

In a further embodiment of the invention illustrated in FIG. 5, a bulk mail card **10*c* includes a perforation/-fold line 16*c* which separates an index card portion 14*c* and a further portion 12*c*. The index card portion 14*c* includes printed reference information and lower necked apertures 18*c*. The further portion 12*c* also contains printed information relating to an advertiser but may be folded back over the face of the portion 14*c* and includes its own necked apertures 38*c* for being carried in the rail card file. At a later date, the potential user may separate the card portion 12*c***, remove it from the card file and utilize its preprinted indicia as a discount coupon or return mailer, or for other purposes.

Figure 6:
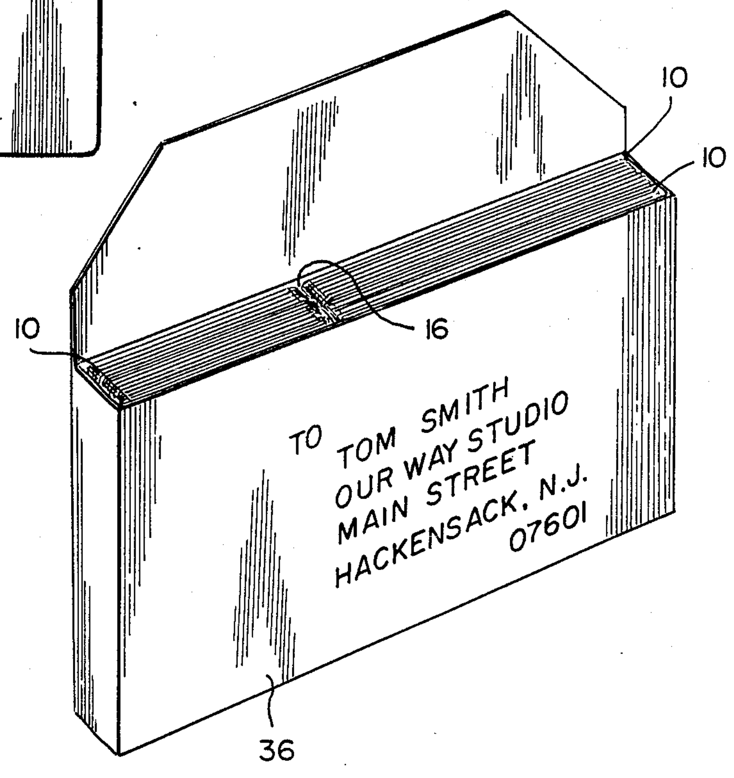
FIG. 6 is a perspective view of a deck of mail cards carried in a packet.

As previously discussed, a deck of cards 10, **10*a* or 10*b***, each bearing advertising copy and data relative to a particular advertiser are carried in a packet or envelope 36 as illustrated in FIG. 6. The recipient sorts through the cards and retains cards relating to products or services within which there is an interest. Thereafter, the index card portions of each card are separated and appropriately filed for later information retrieval. The disposable direct response reply mail and/or coupon portions of each card are either completed and mailed, utilized for suitable rebates or discounts or credits or may be discarded.

Thus it will be seen that there is provided a direct mail advertising system which achieves the various aspects, features and considerations of the present invention and which is well suited to meet the conditions of practical use.

As various changes might be made in the system as above set forth, it is to be understood that all matter herein described or shown in the accompanying drawings is to be interpreted as a lustrative and not in a limiting sense.

Having thus described the invention, there is claimed as new and desired to be secured by Letters Patent:

1. A direct mail advertising system for distribution to potential customers on a mailing list, the system comprising a plurality of cards and a mailing packet, the plurality of cards being carried in the packet, each card of the plurality including a pair of parallel longitudinal edges and perforation means extending between the longitudinal edges along a straight line perpendicular to the longitudinal edges, the perforation means for separating the card into two portions, one of the portions comprising an index card, a portion of each longitudinal edge comprising a side edge of each index card, the one portion including means for attachment to a rail type file for storage and retrieval, the means for attachment including a pair of necked apertures cut through the one portion and opening into a peripheral edge of the one portion, the one portion including reference information stored thereon, the reference information comprising directions for use of an advertiser's product in food recipe format, the other portion including means for response usage comprising means for redemption in conjunction with the purchase of a food product, the other portion having a surface area not substantially greater than twice the surface area of the index card.

2. A direct mail advertising system constructed in accordance with claim 1 wherein the other portion of each card includes a plurality of segments each of the segments including means for redemption.

3. A direct mail advertising card suitable for distribution to potential customers on a mailing list, the card comprising a pair of parallel side edges, means forming a fold line extending between and perpendicular to the side edges for demarking the card into two portions, the fold line including perforation means for physically separating the two portions, each of the portions comprising an index card and being substantially the same size, each of the index cards carrying preprinted information, each of the index cards including congruent means for attachment to a rail type file, the means for attachment including a pair of necked apertures cut through each of the index cards and opening into the fold line, the card being foldable about the fold line and each of the portions being simultaneously mountable to the rail type file without physical separation of the two portions, each of the portions including information stored thereon, whereby the two portions may be stored and carried in the file attached to one another along the fold line individually accessed and subsequently separated.

4. A direct mail advertising card constructed in accordance with claim 3 wherein the information stored on each portion relates to a single advertiser.

5. A method for storing and retrieving information using an index card and a desk top rail type file storage system, the index card being substantially rectangular in configuration and including means for attachment to the rail type card file for storage and retrieval, the rail type card file carrying a plurality of like index cards, the means for attachment including at least one necked aperture cut through the card and opening into an edge of the card, the card including human readable indicia in at least one area thereof and means for storing information on another area of the card, the means for storing information on another area of the card, the means for storing information carrying information in machine readable format, the method comprising the steps of:

(a) accessing the index card by visually examining the human readable indicia on the index cards in the file and determining from such visual examination the card bearing the machine readable indicia which is to be accessed;
(b) physically removing the card from the rail type card file;
(c) placing the card into engagement with a machine capable of reading the machine readable indicia;
(d) utilizing the machine to retrieve the stored information; and
(e) returning the card to the file.

6. A method in accordance with claim 5 wherein the means for storing information comprises a magnetic stripe, the step of placing a card into engagement with the machine comprising providing relative movement between the magnetic stripe and a magnetic decoder.

7. A method in accordance with claim 5 wherein the means for storing information comprises an optical bar code, the step of placing the card into engagement comprising providing relative movement between an optical decoder and the bar code.

8. A method of storing and retrieving advertising information carried on a direct mail advertising card constructed in accordance with claim 5, one of the index cards carrying preprinted means for response usage, the method comprising the steps of:

(a) registering the necked apertures of each index card with one another by folding the advertising card along the fold line;
(b) providing a rail type card file having a pair of rails;
(c) storing both index cards in the rail type card file by engaging the necked apertures with the rails of the card file;
(d) subsequently retrieving both index cards by disengaging the necked apertures from the rails;
(e) physically separating the index cards from one another by pulling the index cards apart along the perforation means; and
(f) returning one of the index cards to the rial type card file.

9. A method of storing and retrieving advertising information in accordance with claim 8 wherein the other index card comprises a return mail card, the method further including the steps of:

(g) depositing the other index card in the mail.

10. A method of storing and retrieving advertising information in accordance with claim 8 wherein the other index card includes redemption means, the method further including the steps of:

(a) utilizing the redemption means in conjunction with the purchase of goods or services.

* * * * *